United States Patent
Harata

(10) Patent No.: US 9,032,182 B2
(45) Date of Patent: May 12, 2015

(54) ELECTRONIC APPARATUS WITH STORAGE MEDIA HAVING REAL ADDRESS DESIGNATED BY STIMULATED REQUEST FORMAT AND STORAGE MEDIA HAVING REAL ADDRESS NOT DESIGNATED BY STIMULATED REQUEST FORMAT

(75) Inventor: Yuzo Harata, Chiryu (JP)

(73) Assignee: Denso Corporation, Kariya (JP)

( * ) Notice: Subject to any disclaimer, the term of this patent is extended or adjusted under 35 U.S.C. 154(b) by 866 days.

(21) Appl. No.: 13/280,614

(22) Filed: Oct. 25, 2011

(65) Prior Publication Data

US 2012/0110296 A1 May 3, 2012

(30) Foreign Application Priority Data

Oct. 28, 2010 (JP) .................................. 2010-242341

(51) Int. Cl.
*G06F 12/00* (2006.01)
*G06F 12/06* (2006.01)

(52) U.S. Cl.
CPC ...................... *G06F 12/06* (2013.01)

(58) Field of Classification Search
CPC ................................ G06F 12/02; G06F 12/06
USPC .................................................. 711/203, 103
See application file for complete search history.

(56) References Cited

U.S. PATENT DOCUMENTS

| 2006/0026381 A1 | 2/2006 | Doi et al. |
| 2007/0266199 A1 | 11/2007 | Peled et al. |
| 2009/0030570 A1 | 1/2009 | DeLagny et al. |
| 2010/0174847 A1* | 7/2010 | Paley et al. .................. 711/103 |

FOREIGN PATENT DOCUMENTS

JP 2009-110476 5/2009

OTHER PUBLICATIONS

International Standard ISO 14229-1 "Road Vehicles—Unified Diagnostic Services (UDS)—Part 1 Specification and Requirements" First Edition Dec. 1, 2006.

* cited by examiner

*Primary Examiner* — Larry Mackall
(74) *Attorney, Agent, or Firm* — Harness, Dickey & Pierce, PLC

(57) ABSTRACT

A diagnostic tool sends a request format designating a virtual address, which is different from a real address for an EEPROM. When a microcomputer determines that an address designated by the received request format is a virtual address assigned to the EEPROM, the microcomputer executes a process, which is designated by the received request format, with respect to the virtual address assigned to the EEPROM.

11 Claims, 8 Drawing Sheets

ELECTRONIC APPARATUS WITH STORAGE MEDIA HAVING REAL ADDRESS DESIGNATED BY STIMULATED REQUEST FORMAT AND STORAGE MEDIA HAVING REAL ADDRESS NOT DESIGNATED BY STIMULATED REQUEST FORMAT

CROSS REFERENCE TO RELATED APPLICATION

The present application is based on and incorporates herein by reference Japanese Patent Application No. 2010-242341 filed on Oct. 28, 2010.

FIELD OF THE INVENTION

The present invention relates to an electronic apparatus containing a control circuit which executes a process designated by a request format upon receiving the request format from an external instrument, the request format being stipulated in a predetermined telecommunications standard.

BACKGROUND OF THE INVENTION

[Patent document 1]: JP-2009-519171 A (US 2009/0030570 A1)

[Nonpatent document 1]: ISO 14229-1 (UDS)

There is conventionally proposed a method for connecting a diagnostic tool to a computer which controls movement of a vehicle, and diagnosing an operation failure (for example, refer to Patent document 1).

Further, there is an apparatus which connects the diagnostic tool to the computer that controls movement of the vehicle and diagnoses an operation failure. Such an apparatus is compliant with a predetermined telecommunications standard like Nonpatent document 1 and achieves communication between the diagnostic tool and the computer that controls movement of the vehicle. Furthermore, the apparatus follows a request format stipulated in the predetermined telecommunications standard to be able to perform read-out or writing of data from the diagnostic tool to a storage media (for example, a built-in storage media such as RAM and ROM, also referred to a stipulated storage media) of the computer that controls movement of the vehicle.

In this apparatus, an address area of the stipulated storage media is naturally assigned with real addresses; thereby, the read-out of data from or the writing of data to the stipulated storage media can be enabled by using the request format that is stipulated in the predetermined telecommunications standard while designating a real address of a stipulated storage media. In contrast, there is a storage media whose address area has a real address that is not defined as being enabled to accept read-out or the writing of data using a request format that is stipulated in the predetermined telecommunications standard. In other words, such a storage media (also referred to as a non-stipulated storage media) has naturally a real address; however, the real address of the non-stipulated storage media is not defined or stipulated in the predetermined telecommunications standard. Thus, the read-out of data and the writing of data with respect to that non-stipulated storage media cannot be executed.

For instance, much information useful for failure diagnoses is stored in non-stipulated storage media such as an EEPROM or flash memory connected to a microcomputer, and a memory device mounted in another ECU. However, the real addresses of these non-stipulated storage media are not defined or stipulated as a real address that can be designated by the request format stipulated in the predetermined telecommunications standard; thus, the read-out of data and the writing of data to those non-stipulated storage media other than the above stipulated storage media cannot be achieved under the predetermined telecommunications standard.

To that end, an interface device may be separately needed for accessing the non-stipulated storage media; further, another diagnostic tool may be needed to be connected to this interface to achieve the writing or read-out of the data with respect to the non-stipulated storage media.

SUMMARY OF THE INVENTION

It is an object of the present invention to achieve a process, which responds to a request format sent from an external instrument, even for a storage media of which address area has a real address that is undefined as being designated by the request format.

To achieve the above object, according to an aspect of the present invention, an electronic apparatus is provided as follows. A control circuit is included to receive a stipulated request format, which is stipulated in a predetermined telecommunications standard and sent by an external instrument, and execute a process designated by the stipulated request format upon receiving the stipulated request format. A first storage media is included to contain an address area having a real address that is defined as being designated by the stipulated request format. A second storage media is included to contain an address area having a real address that is not defined as being designated by the stipulated request format. Herein, the external instrument is enabled to send the stipulated request format, which is directed to the second storage media, by using a virtual address that is different from the real address of the second storage media. The control circuit is further configured to determine whether an address designated by the stipulated request format is a virtual address assigned to the second storage media, and execute a process, which is designated by the stipulated request format, to the virtual address assigned to the second storage media when determining that the address designated by the request format is the virtual address assigned to the second storage media.

Thus, under the above configuration, a process responding to a request format sent from an external instrument can be achieved even for a storage media of which address area has a real address that is undefined as being designated by the request format that is stipulated in a predetermined telecommunications standard.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
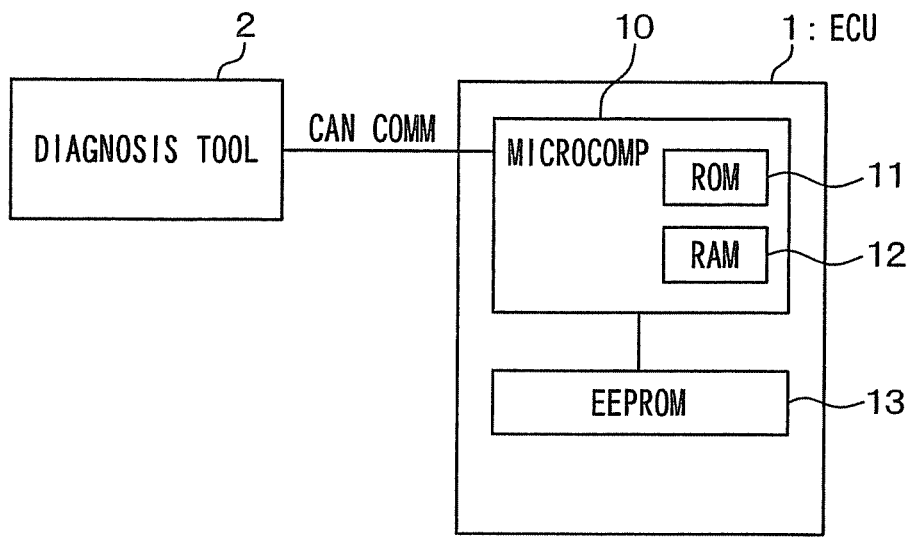
FIG. 1 is a diagram illustrating an overall configuration of an electronic apparatus according to a first embodiment of the present invention.

An overall configuration of an electronic apparatus according to a first embodiment of the present invention is illustrated in FIG. 1. The present electronic apparatus 1 is configured as an electronic control unit (ECU) mounted in a vehicle. The present electronic apparatus 1 executes a CAN communication with a diagnostic tool 2 serving as an external instrument. The electronic apparatus 1 in the present embodiment executes a CAN communication with the diagnostic tool 2 according to a predetermined telecommunications standard. In the present embodiment, the predetermined telecommunications standard is a standard stipulated in ISO 14229-1 (UDS) of an International Standard of Nonpatent document 2. The present embodiment uses CAN as a communication method; further, it can use another communication method such as FlexRay other than CAN.

The electronic apparatus 1 includes a microcomputer 10 as a control circuit, and an EEPROM 13.

The microcomputer 10 is configured as a computer which contains a ROM 11 and RAM 12, and executes various processes according to a program stored in the ROM 11.

The microcomputer 10 collects periodically various information which is useful for failure diagnosis, and executes a process to store or record the collected information in the EEPROM 13.

In addition, when receiving a request format, which is stipulated in the predetermined telecommunications standard, from the diagnostic tool 2, the microcomputer 10 executes a process designated by or responding to the request format. The processes designated by the request format include a writing of data and a read-out of data.

Figure 2:
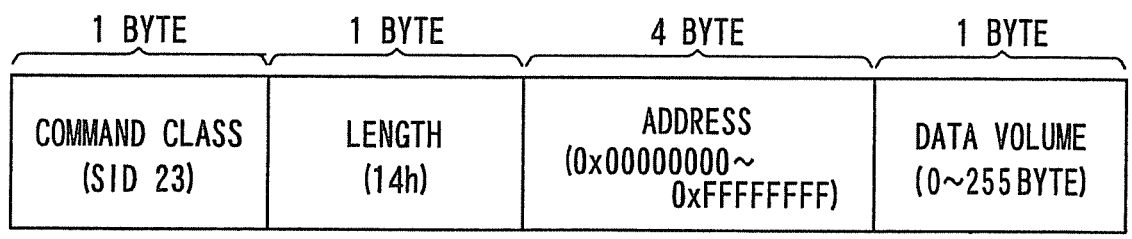
FIG. 2 is a diagram for explaining a read request format.

An example of a read request format stipulated in the predetermined telecommunications standard is illustrated in FIG. 2. This request format contains a command class area for indicating a command type, an address length/data length designation area for designating (i) an address length of an address and (ii) a data length of data, an address designation area for designating a start the address of the data to read, and a data volume designation area for designating a data volume of the data to read.

In the command class area, SID 23 signifies an address designation read command. In the address length/data length designation area, lower 4 bits is an address length designation area and higher 4 bits is a data length designation area. For instance, in this example of FIG. 2, in the address length/data length designation area, 14h (h means a hexadecimal number) indicates that the data length is 1 h (1 byte) and the address length is 4 h (4 bytes). In addition, in the address designation area, a designation possible area is 0x00000000-0xFFFFFFFF (0x means a hexadecimal number) since the address length of this example is 4 bytes that is indicated in the lower 4 bits of the address length/data length designation area. In the data volume designation area, a designation possible area is 0 to 255 bytes since the address length of this example is 1 byte that is indicated in the higher 4 bits of the address length/data length designation area.

Figure 3:
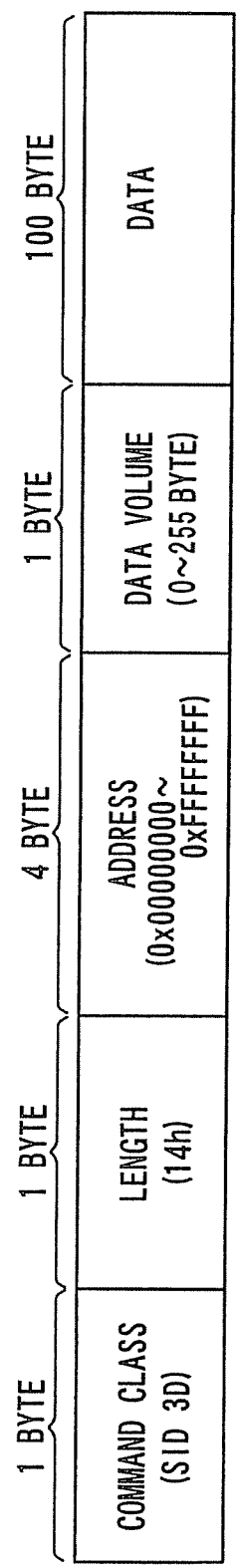
FIG. 3 is a diagram for explaining a writing request format.

An example of a writing request format stipulated in the predetermined telecommunications standard is illustrated in FIG. 3. This request format contains a command class area for indicating a command type, an address length/data length designation area for designating (i) an address length of an address and (ii) a data length of data, an address designation area for designating a start address of the data to write, a data volume designation area for designating a data volume of the data to write, and a data designation area for designating the data to write.

In the command class area, SID 3D signifies a address designation write command. In addition, the data designation area designates data having a data volume which is designated in the data volume designation area.

Figure 4:
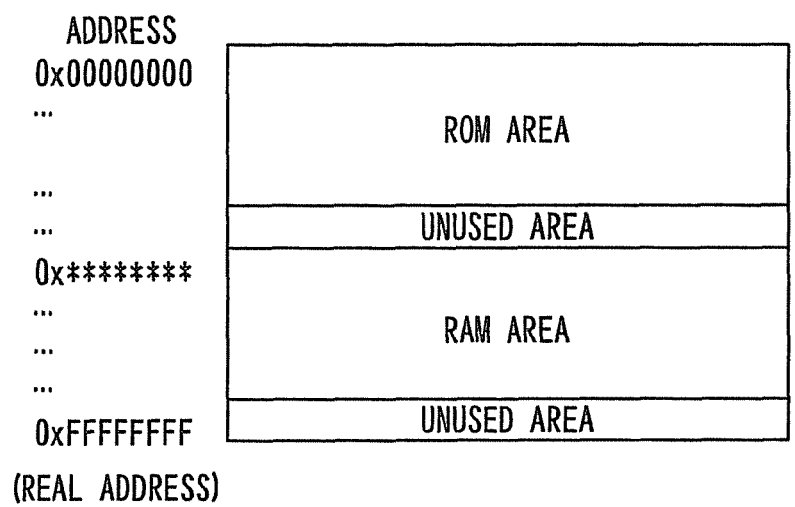
FIG. 4 is a diagram illustrating a memory area having real addresses in an ROM and RAM of the electronic apparatus according to the first embodiment.

FIG. 4 illustrates a memory area (i.e., address area) of real addresses about the ROM 11 and RAM 12 in the present embodiment. That is, the addresses indicated in the drawing are real addresses. As illustrated, the ROM 11 and RAM 12 built in the microcomputer 10 has a memory area or address area having the addresses 0x00000000-0xFFFFFFFF (0x signifies a hexadecimal number) as real addresses of 4 bytes.

Now, it is presumed that (i) a request format that is stipulated in the predetermined telecommunications standard has a configuration to designate an address as a real address of a storage media such as an ROM and RAM and (ii) a read-out or writing by the request format is enabled to be executed with respect to such a real address designated by the request format. In such a case, the address areas of the ROM 11 and RAM 12 of the microcomputer 10 are assigned with such real addresses that are defined as being designated by the request format stipulated in the predetermined telecommunications standard; the read-out from or writing to the ROM 11 and RAM 12 is thereby enabled to be executed according to the request format designating the real address of the ROM 11 or the RAM 12.

Figure 5:
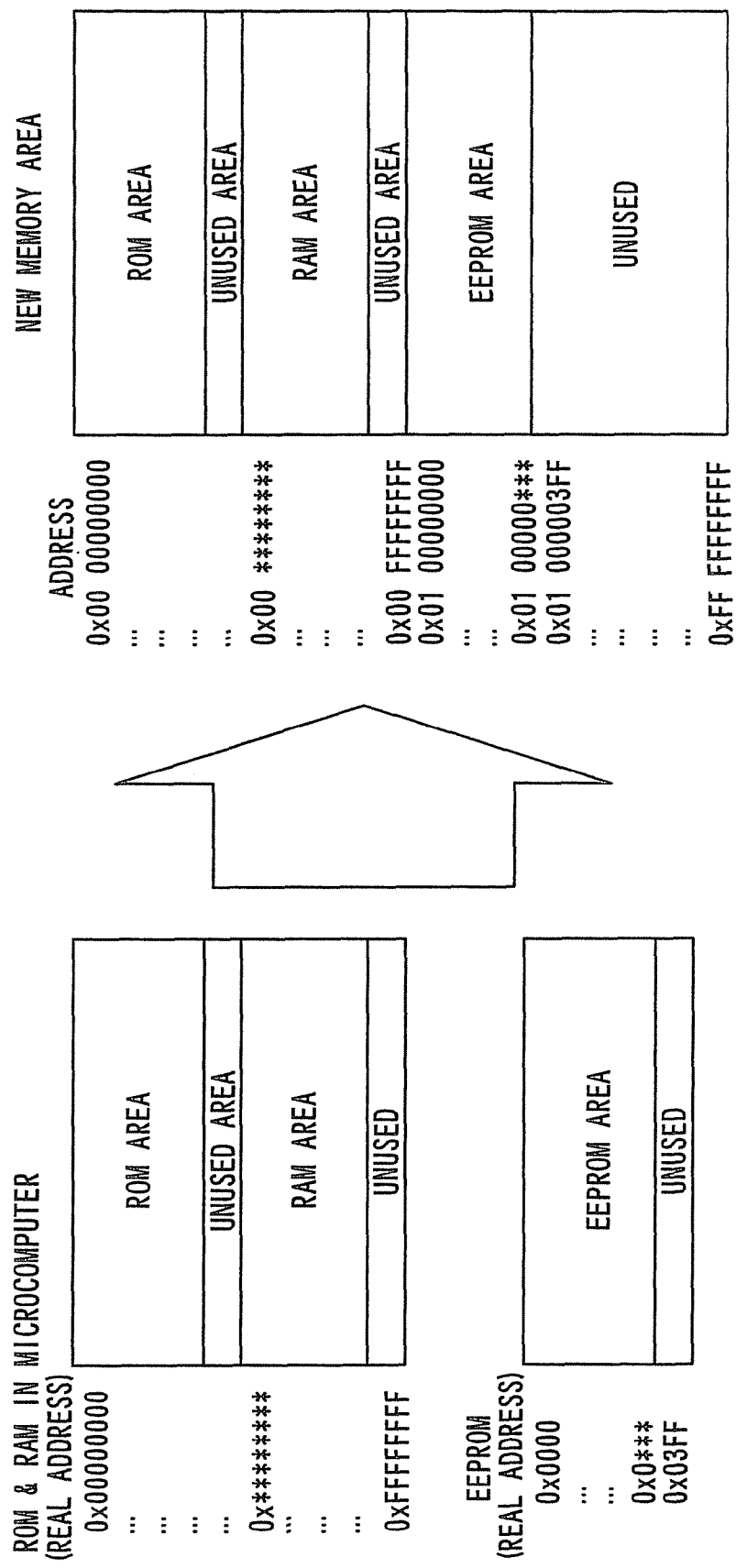
FIG. 5 is a diagram illustrating a new memory area in an ROM, RAM, and EEPROM of the electronic apparatus according to the first embodiment.

In contrast, the EEPROM 13 in the present embodiment has a memory area or address area having the addresses 0x0000-0x03FF (0x signifies a hexadecimal number) as real addresses of 2 bytes with reference to the left lower portion of FIG. 5. These real addresses of the EEPROM 13, however, are not defined as being designated by the request format that is stipulated in the predetermined telecommunication standard. Thus, the read-out from or writing to the EEPROM 13 according to the request format that is stipulated in the predetermined telecommunications standard cannot be executed.

To that end, in the present embodiment, virtual addresses different from the real addresses are assigned to the EEPROM 13. The diagnostic tool 2 sends out a request format that designates those virtual addresses. The writing or read-out of the data in the EEPROM 13 can be thereby executed.

FIG. 5 illustrates an assignment of a new memory area in the ROM 11, the RAM 12, and the EEPROM 13 in the present embodiment. As illustrated, 8 bits are added to the real addresses of the ROM 11 and RAM 12, which are illustrated in the upper left portion of FIG. 5. Thereby, the address area of the ROM 11 and RAM 12 is changed from 0x00000000-0xFFFFFFFF as real addresses to 0x0000000000-0x00FFFFFFFF as virtual addresses; further, a virtual address area is newly assigned to the EEPROM 13 as 0x0100000000-0x01000003FF. It is noted that the bit length which is added is optional, and is not limited to 8 bits as long as the length of a virtual address for each of the several storage media such as an ROM, RAM, and EEPROM becomes identical to each other so as to uniquely designate each of the virtual addresses of all the several storage media within a newly assigned virtual address area.

Thus, in the present embodiment, an address space higher than the address area assigned as real addresses to the ROM 11 and RAM 12 is assigned with virtual addresses for the EEPROM 13. Each memory area of the ROM 11, the RAM 12, and the EEPROM 13 is assigned with virtual addresses which have an identical.

In the present embodiment, there may be called two kinds of request formats. One is a real address designating request format (also referred to as a request format for real addresses) that designates a real address; the other is a virtual address designating request format (also referred to as a request format for virtual addresses) that designates a virtual address. For instance, when the value of address length/data length designation area is 14 h as indicated in FIG. 2 and FIG. 3, a request format is determined to be corresponding to a real address designating request format; when the value is 15 h, a request format is determined to be corresponding to a virtual address designating request format. That is, the address length of the real address designating request format is 4 bytes whereas the address length of the virtual address designating request format is 5 bytes.

Such a difference in the address length is used for the microcomputer to distinguish between the real address designating request format and the virtual address designating request format.

The diagnostic tool 2 sends out as usual a request format for real addresses which designates a real address for the ROM 11 and RAM 12, and causes the microcomputer 10 to execute a process according to the request format for real addresses. Further, the diagnosis tool 2 sends out a request format for virtual addresses which designates a virtual address newly assigned to the ROM 11, RAM 12, and EEPROM 13 and causes the microcomputer 10 to execute a process according to the request format for virtual addresses.

Figure 6:
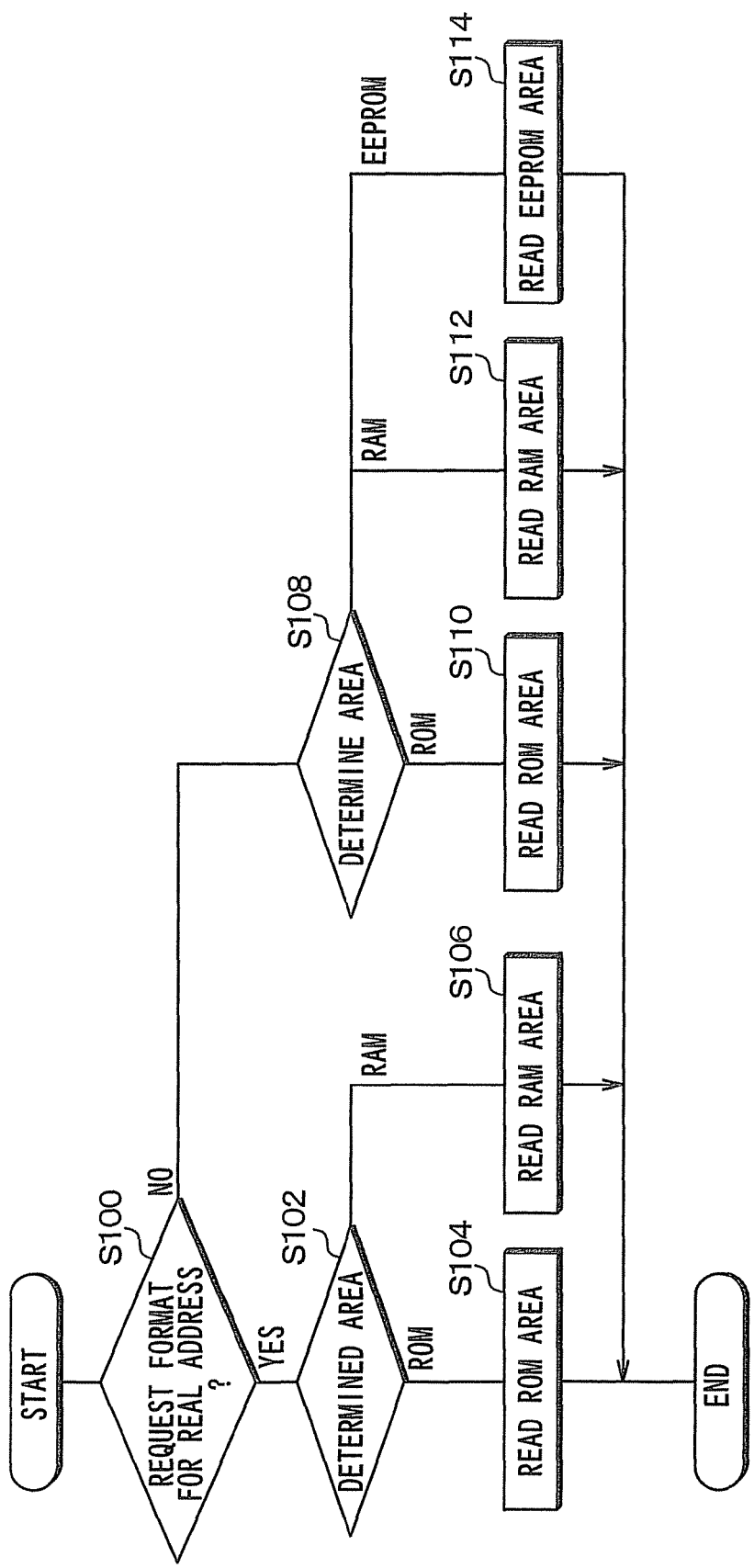
FIG. 6 is a flowchart diagram in cases when a microcomputer receives a read request format according to the first embodiment.

FIG. 6 illustrates a flowchart in cases when the microcomputer 10 receives a read request format according to the first embodiment. The microcomputer 10 execute a process indicated in FIG. 6 when receiving the read request format from the diagnostic tool 2.

It is further noted that a flowchart or the processing of the flowchart in the present application includes sections (also referred to as steps), which are represented, for instance, as S100. Further, each section can be divided into several subsections while several sections can be combined into a single section. Furthermore, each of thus configured sections can be referred to as a device, means, module, or processor and achieved not only as a software section in combination with a hardware device but also as a hardware section. Furthermore, the software section may be included in a software program, which may be contained in a non-transitory computer-readable storage media as a program product.

First, it is determined whether a read request format that is received is a request format for real addresses based on a value of the address length/data length designation area in the received read request format (S100).

When the value of the address length/data length designation area in the received read request format is 14 h, the determination at S100 is affirmed as YES. Next, an area determination is made based on the address designated by the received read request format (S102). In other words, it is determined whether the read-out relative to the ROM area or the RAM area is made by the request format.

When it is determined that the address designated by the received read request format belongs to the ROM area, the determination at S102 is the ROM area "ROM". The data corresponding to the designated address of the ROM area is read. A response format containing the read data is sent out to the diagnostic tool 2 (S104). The present process is then ended. The explanation about the response format is omitted.

In contrast, when it is determined that the address designated by the received read request format belongs to the RAM area, the determination at S102 is the RAM area "RAM". The data corresponding to the designated address of the RAM area is read. A response format containing the read data is sent out to the diagnostic tool 2 (S106).

When the value of the address length/data length designation area in the received read request format is 15 h, the determination at S100 is negated as NO. Next, an area determination is made based on the address designated by the received read request format (S108). In detail, it is determined whether the read-out relative to the ROM area, the RAM area, or the EEPROM area is made by the request format.

When it is determined that the address designated by the received read request format belongs to the ROM area, the determination at S108 is the ROM area "ROM". The data corresponding to the designated address of the ROM area is read. A response format containing the read data is sent out to the diagnostic tool 2 (S110). The present process is then ended.

When it is determined that the address designated by the received read request format belongs to the RAM area, the determination at S108 is the RAM area "RAM". The data corresponding to the designated address of the RAM area is read. A response format containing the read data is sent out to the diagnostic tool 2 (S112).

When it is determined that the address designated by the received read request format belongs to the EEPROM area, the determination at S108 is the EEPROM area "EEPROM". The data corresponding to the designated address of the EEPROM area is read. A response format containing the read data is sent out to the diagnostic tool 2 (S114).

As described above, even though the EEPROM 13 has an address area whose real addresses are not defined as being designated in a request format, the configuration according to the present embodiment enables the diagnostic tool 2 to execute the read-out from the EEPROM 13.

The above explains the process in cases when the microcomputer 10 receives a read request format. The process in cases when the microcomputer 10 receives a write request format can be executed similarly. It is noted that the present example is an example. The determination order may be changed. For instance, at S104, S106, S110, and S112 of the flowchart in FIG. 6, the process which reads data from each storage media and sends out a response format containing the read data to the diagnostic tool 2 are replaced with the process which writes data to each storage media and sends out a response format containing the written data to the diagnostic tool 2.

According to the above-mentioned configuration, the diagnostic tool 2 sends a request format designating a virtual address, which is different from a real address, for the EEPROM 13. When determining that the address designated by the request format is a virtual address assigned to the EEPROM 13, the microcomputer 10 executes a process, which is designated by the request format, to the virtual address assigned to the EEPROM 13. That is, the microcomputer 10 can realize the process according to the request format from the diagnostic tool 2 also with respect to the EEPROM 13 having an address area whose real addresses is undefined as being designated by the request format stipulated in the predetermined telecommunications standard.

Further, the diagnostic tool 2 also sends a request format designating a virtual address, which is different from a real address, for the ROM 11 and the RAM 12. When determining that the address designated by the request format is a virtual address assigned to the ROM 11 or the RAM 12, the microcomputer 10 executes a process, which is designated by the request format, to the virtual address assigned to the ROM 11 or the RAM 12. That is, even with respect to a storage media having an address area whose real addresses are defined as being designated by the request format stipulated in the predetermined telecommunications standard, the diagnostic tool 2 sends out a request format which designates a virtual address to thereby achieve the process according to the request format.

In addition, when determining that the request format sent out from the diagnostic tool 2 is a request format for designating a real address, the microcomputer 10 regards the address designated by the request format as a real address. In addition, when determining that the request format sent out from the diagnostic tool 2 is a request format for designating a virtual address, the microcomputer 10 regards the address designated by the request format as a virtual address to thereby execute a process designated by the request format. That is, the diagnostic tool 2 sends out the request format which designates a real address to thereby cause the microcomputer 10 to execute the process designated by the request format; further, the diagnostic tool 2 sends out the request format which designates a virtual address to thereby cause the microcomputer 10 to execute the process designated by the request format.

Second Embodiment

Figure 7:
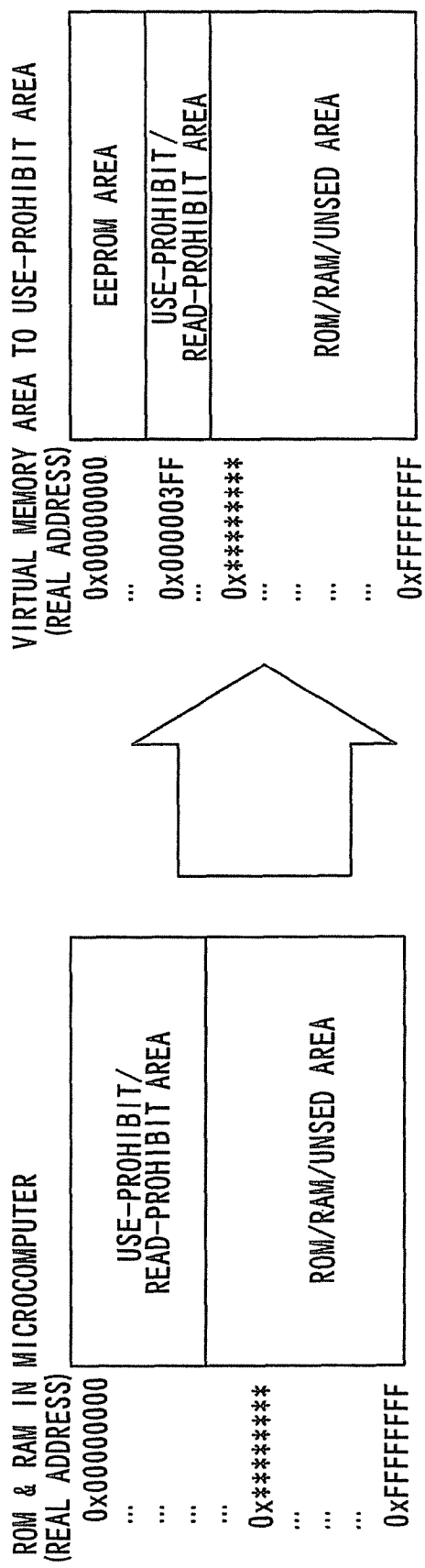
FIG. 7 is a diagram illustrating a new memory area in an ROM, RAM, and EEPROM of the electronic apparatus according to a second embodiment of the present invention.

In the above first embodiment, an address area of virtual addresses assigned to the EEPROM 13 is provided to be higher in an address space or address order than an address area of real addresses assigned to the ROM 11 and RAM 12. In contrast, in a second embodiment, as indicated in FIG. 7, addresses assigned to the ROM 11 and RAM 12 remains real addresses while virtual addresses for the EEPROM 13 are assigned to an address area, which has real addresses for the ROM 11 and RAM 12 and serves as a use prohibition area (also referred to a disable area), an address area, which has real addresses for the ROM 11 and RAM 12 and serves as a non-use area (i.e., not used area), or an address area, which has real addresses for the ROM 11 and RAM 12 and serves as a read prohibition area (also referred to as a read disable area).

Further, in the above first embodiment, the diagnostic tool 2 sends either a request format for real addresses or a request format for virtual addresses. In the present embodiment, the request format sent out from the diagnostic tool 2 is only one kind.

Figure 8:
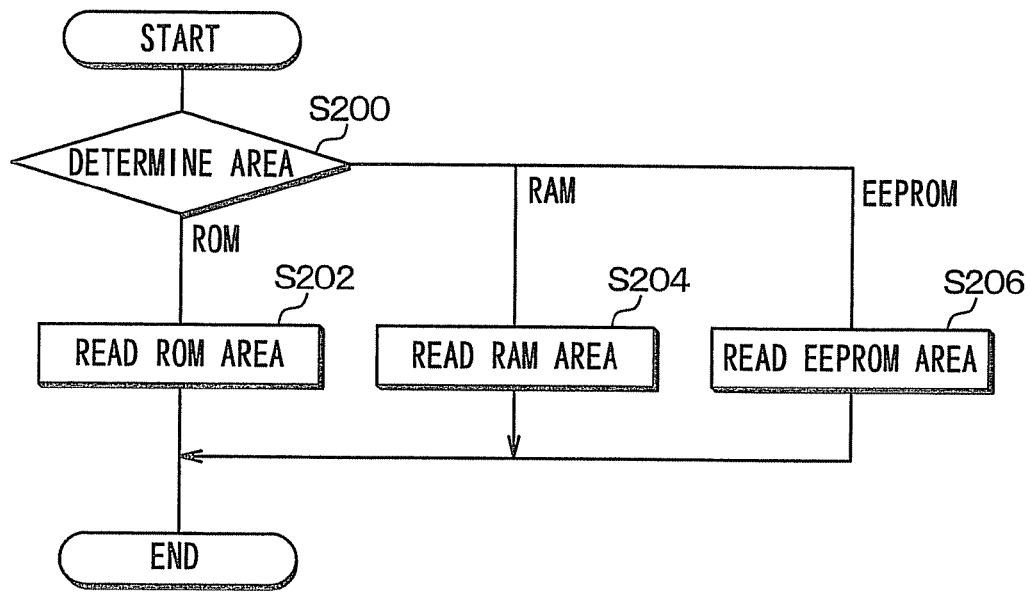
FIG. 8 is a flowchart diagram in cases when a microcomputer receives a read request format according to the second embodiment.

FIG. 8 illustrates a flowchart in cases when the microcomputer 10 receives a read request format according to the second embodiment. The microcomputer 10 executes a process indicated in FIG. 8 when receiving the read request format from the diagnostic tool 2.

First, an area determination is made based on the address designated by the received read request format (S200). In detail, it is determined whether the read-out relative to the ROM area, the RAM area, or the EEPROM area is made by the request format.

When it is determined that the address designated by the received read request format belongs to the ROM area, the determination at S200 is the ROM area "ROM". The data corresponding to the designated address of the ROM area is read. A response format containing the read data is sent out to the diagnostic tool 2 (S202). The present process is then ended.

When it is determined that the address designated by the received read request format belongs to the RAM area, the determination at S200 is the RAM area "RAM". The data corresponding to the designated address of the RAM area is read. A response format containing the read data is sent out to the diagnostic tool 2 (S204).

When it is determined that the address designated by the received read request format belongs to the RAM area, the determination at S200 is the EEPROM area "EEPROM". The data corresponding to the designated address of the EEPROM area is read. A response format containing the read data is sent out to the diagnostic tool 2 (S206).

As described above, although the EEPROM 13 has an address area whose real addresses are not defined as being designated by a request format, the configuration according to the present embodiment enables the diagnostic tool 2 to execute the read-out from the EEPROM 13.

The above explains the process in cases when the microcomputer 10 receives a read request format. The process in cases when the microcomputer 10 receives a write request format can be executed similarly.

Third Embodiment

In the first embodiment, the diagnostic tool 2 sends out either a request format for real addresses or a request format for virtual addresses. In a third embodiment, the diagnosis tool 2 sends out two of (i) a first request format that designates real addresses of the ROM 11 and the RAM 12, and (ii) a second request format, which designates real addresses of the EEPROM 13 and is not stipulated in the predetermined telecommunications standard. Herein, the first request format is also referred to as a stipulated request format whereas the second request format is also referred to as a non-stipulated request format It is noted that in the present embodiment, there is a difference in address length between the first request format that is stipulated in the predetermined telecommunications standard and the second request format that is not stipulated in the predetermined telecommunications standard.

Figure 9:
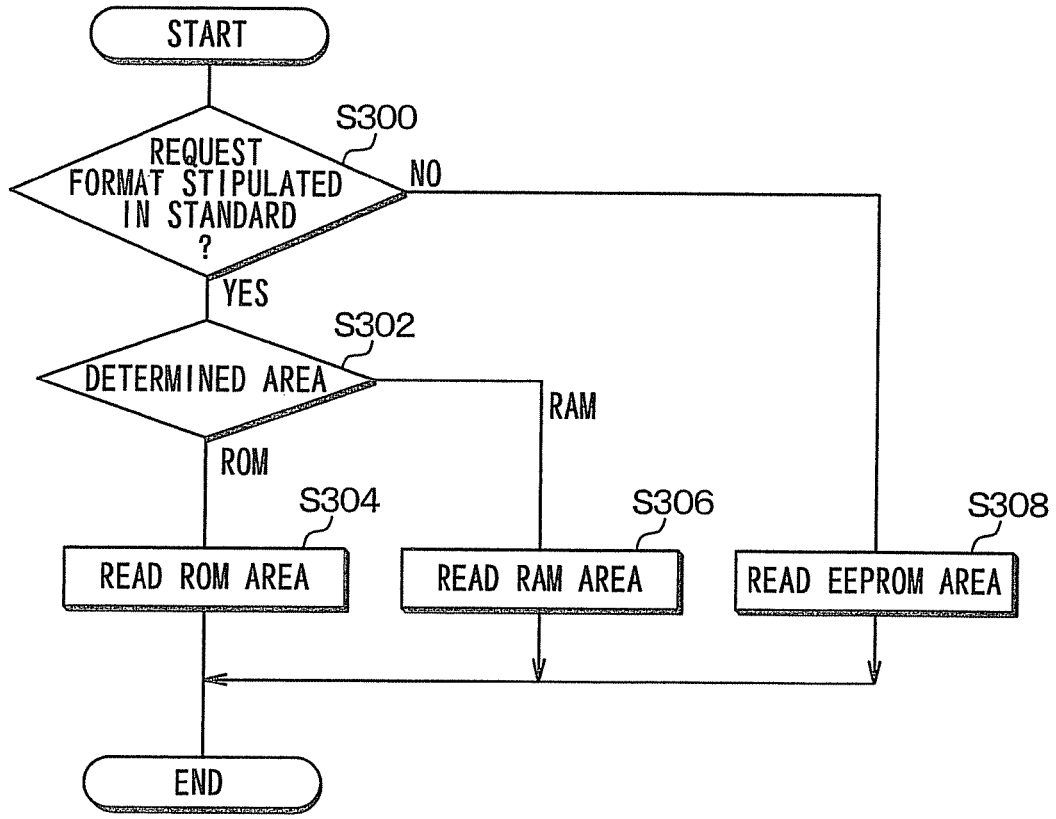
FIG. 9 is a flowchart diagram in cases when a microcomputer receives a read request format according to a third embodiment of the present invention.

FIG. 9 illustrates a flowchart in cases when the microcomputer 10 receives a read request format according to the third embodiment. The microcomputer 10 executes a process indicated in FIG. 9 when receiving the read request format from the diagnostic tool 2.

First, it is determined whether a received read request format corresponds to a stipulated request format that is stipulated in the predetermined telecommunications standard or a non-stipulated request format that is not stipulated in the predetermined telecommunications standard, based on the command class and/or address data length designated by the received read request format (S300).

When, it is determined that the received read request format corresponds to the stipulated request format based on the command class and address data length designated by the received read request format, the determination at S300 is affirmed as YES, an area determination is then made (S302). In detail, it is determined whether the read-out relative to the ROM area or the RAM area is made by the request format.

When it is determined that the address designated by the received read request format belongs to the ROM area, the determination at S302 is the ROM area "ROM". The data corresponding to the designated address of the ROM area is read. A response format containing the read data is sent out to the diagnostic tool 2 (S304). The present process is then ended.

When it is determined that the address designated by the received read request format belongs to the RAM area, the determination at S302 is the RAM area "RAM". The data corresponding to the designated address of the RAM area is read. A response format containing the read data is sent out to the diagnostic tool 2 (S306).

In contrast, when, it is determined that the received read request format corresponds to a non-stipulated request format that is not stipulated in the predetermined telecommunications standard based on the command class and address data length designated by the received read request format, the determination at S300 is negated as NO. The data corresponding to the designated address of the EEPROM area is read. A response format containing the read data is sent out to the diagnostic tool 2 (S308). In specific, it is determined whether the received read request format designates a real address of the EEPROM 13. When it is determined that the received read request format designates a real address of the EEPROM 13, the data corresponding to the designated real address of the EEPROM area is read. A response format containing the read data is sent out to the diagnostic tool 2. For instance, please see the left lower portion of FIG. 5. The microcomputer reads out the data corresponding to the real address of the EEPROM 13 designated by the request format (i.e., the non-stipulated request format).

Under the present embodiment, when it is determined that the request format sent out from the diagnostic tool 2 is a request format which is not stipulated in the predetermined telecommunications standard, and that the real address of the EEPROM 13 is designated by the request format, the process designated by the request format is executed for the EEPROM 13. That is, even for the EEPROM 13 has an address area whose real addresses are not defined as being designated in a request format stipulated in the predetermined request format, the configuration according to the present embodiment enables the diagnostic tool 2 to execute the read-out from the EEPROM 13.

The above explains the process in cases when the microcomputer 10 receives a read request format. The process in cases when the microcomputer 10 receives a write request format can be executed similarly.

Other Embodiments

Figure 10:
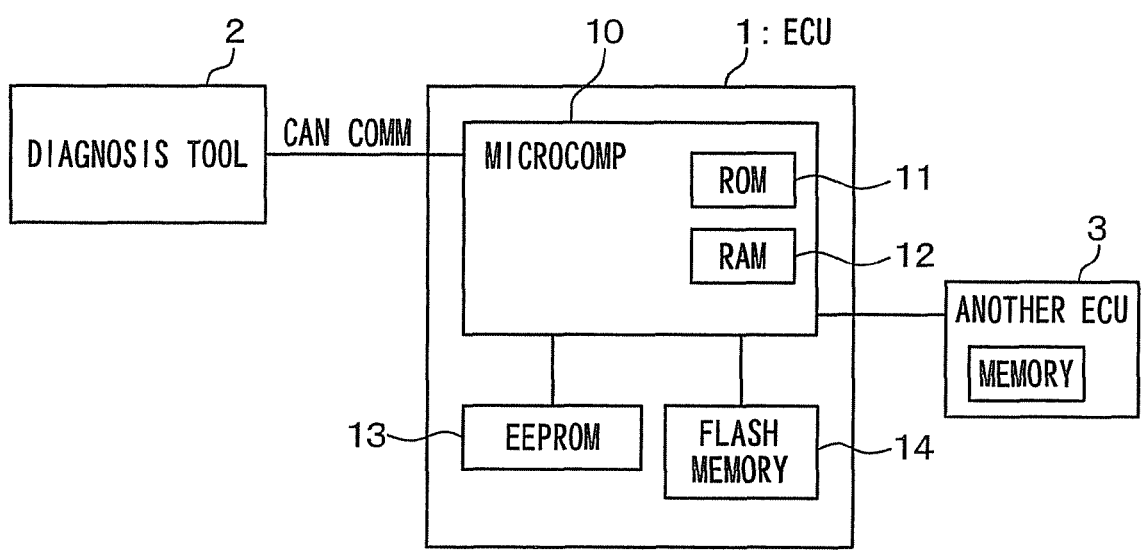
FIG. 10 is a diagram for explaining a modification example.

In the above embodiments, the ROM 11 and the RAM 12 are defined as a first storage media of which an address area has real addresses that can be designated by a request format stipulated in the predetermined telecommunications standard; the EEPROM 13 is defined as a second storage media of which an address area has real addresses that are not defined as being designated by a request format that is stipulated in the predetermined telecommunications standard. There is no need to be limited to such a configuration. For instance, another ROM or another RAM, which is different from the ROM 11 or the RAM 12 in the microcomputer 10, for instance, may be defined as a second storage media of which an address area has real addresses that are not defined as being designated by a request format that is stipulated in the predetermined telecommunications standard. Further, as illustrated in FIG. 10, a flash memory 14 connected to the microcomputer 10 and another ECU 3 communicated with the microcomputer 10 may be defined as a second storage media of which an address area has real addresses that are not defined as being designated by a request format stipulated in the predetermined telecommunications standard. Furthermore, the EEPROM 13 may be defined as a first storage media of which an address area has real addresses that are defined as being designated by a request format that is stipulated in another predetermined telecommunication standard.

Further, in the above second embodiment (see FIG. 7), an address area of virtual addresses assigned to the EEPROM 13 is provided to be higher in an address space or address order than an address area of real addresses assigned to the ROM 11 and RAM 12. An address area of virtual addresses assigned to the EEPROM 13 may be provided to be lower in an address space or address order than an address area of real addresses assigned to the ROM 11 and RAM 12.

In addition, the electronic control unit (ECU) mounted in the vehicle is included in the electronic apparatus 1 in the above embodiments. It is not limited to the electronic control unit.

Further, in the above embodiments, the electronic apparatus 1 and the diagnostic tool 2 are communicated with each other according to the predetermined telecommunications standard stipulated in ISO 14229-1 (UDS) which is an International Standard. There is no need to be limited to such a telecommunications standard.

It will be obvious to those skilled in the art that various changes may be made in the above-described embodiments of the present invention. However, the scope of the present invention should be determined by the following claims.

What is claimed:

1. An electronic apparatus comprising:
a control circuit that
receives a stipulated request format, which is stipulated in a predetermined telecommunications standard and sent by an external instrument, and
executes a process designated by the stipulated request format upon receiving the stipulated request format;
a first storage media of which an address area has a real address that is defined as being designated by the stipulated request format; and
a second storage media of which an address area has a real address that is not defined as being designated by the stipulated request format,
wherein the external instrument is enabled to send the stipulated request format, which is directed to the second storage media, by using a virtual address that is different from the real address of the second storage media,
the control circuit being further configured to
determine whether an address designated by the stipulated request format is a virtual address assigned to the second storage media, and
execute a process, which is designated by the stipulated request format, to the virtual address assigned to the second storage media when determining that the address designated by the request format is the virtual address assigned to the second storage media;
wherein the external instrument sends (i) a first request format that is the stipulated request format designating a real address and (ii) a second request format that is the stipulated request format designating a virtual address, by enabling the first request format and the second request format to be differentiated from each other,
the control circuit being further configured to execute a process designated by a request format received from the external instrument on a premise that an address designated by the received request format is a real address when determining that the received request format corresponds to the first request format designating the real address, and/or on a premise that an address designated by the received request format is a virtual address when determining that the received request format corresponds to the second request format designating the virtual address.

2. The electronic apparatus according to claim 1,
wherein the external instrument is enabled to send the stipulated request format, which is directed to the first storage media, by using a virtual address that is different from the real address of the first storage media,
the control circuit being further configured to
determine whether an address designated by the stipulated request format is a virtual address assigned to the first storage media, and
execute a process, which is designated by the stipulated request format, to the virtual address assigned to the first storage media when determining that the address designated by the request format is the virtual address assigned to the first storage media.

3. The electronic apparatus according to claim 1, wherein the address area of the virtual address assigned to the second storage media is assigned to be either higher or lower in respect of address order than the address area of the real address assigned to the first storage media.

4. The electronic apparatus according to claim 1, wherein the address area of the virtual address assigned to the second storage media includes one of
(i) a disable area of a real address assigned to the first storage media,
(ii) an unused area of a real address assigned to the first storage media, and
(iii) a read-out disable area of a real address assigned to the first storage media.

5. The electronic apparatus according to claim 1,
the controller being further configured to differentiate between the first request format designating the real address and the second request format designating the virtual address by determining a difference between a data length of an address designated by the first request format and a data length of an address of the second request format.

6. An electronic apparatus comprising:
a control circuit that
receives a stipulated request format, which is stipulated in a predetermined telecommunications standard and sent by an external instrument, and
executes a process designated by the stipulated request format upon receiving the stipulated request format;
a first storage media of which an address area has a real address that is defined as being designated by the stipulated request format; and
a second storage media of which an address area has a real address that is not defined as being designated by the stipulated request format,
wherein the external instrument is enabled to send the stipulated request format, which is directed to the second storage media, by using a virtual address that is different from the real address of the second storage media,
the control circuit being further configured to
determine whether an address designated by the stipulated request format is a virtual address assigned to the second storage media, and
execute a process, which is designated by the stipulated request format, to the virtual address assigned to the second storage media when determining that the address designated by the request format is the virtual address assigned to the second storage media; wherein the external instrument is enabled to further send a non-stipulated request format that is directed to the second storage media by using a real address of the second storage media, the non-stipulated request format being not stipulated in the predetermined telecommunications standard,
the control circuit being further configured to
determine whether a received request format sent from the external instrument corresponds to the non-stipulated request format designating a real address of the second storage media, and
execute a process designated by the non-stipulated request format to the second storage media when determining that the received request format corresponds to the non-stipulated request format designating the real address of the second storage media.

7. An electronic apparatus comprising:
a control circuit that
receives a stipulated request format, which is stipulated in a predetermined telecommunications standard and sent by an external instrument, and
executes a process designated by the stipulated request format upon receiving the stipulated request format;
a first storage media of which an address area has a real address that is defined as being designated by the stipulated request format; and
a second storage media of which an address area has a real address that is not defined as being designated by the stipulated request format,
wherein the external instrument is enabled to send a non-stipulated request format that is directed to the second storage media by using a real address of the second storage media, the non-stipulated request format being not stipulated in the predetermined telecommunications standard,
the control circuit being further configured to
determine whether a received request format sent from the external instrument corresponds to the non-stipulated request format designating a real address of the second storage media, and
execute a process designated by the non-stipulated request format to the second storage media when determining that the received request format corresponds to the non-stipulated request format designating the real address of the second storage media.

8. An electronic apparatus communicated with an external instrument using a request format to execute a process of read-out of data or writing of data in the electronic apparatus, the electronic apparatus comprising:
a first storage media of which a first address area is assigned with first real addresses each having a first address length, the first real address and the first address length being defined as being designated within a stipulated request format that is stimulated in a predetermined telecommunications standard;
a second storage media of which a second address area is assigned with second real addresses each having a second address length, the second real address and the second address length being not defined as designated within the stipulated request format; and a control circuit that
  receives the stipulated request format designating the first real address along with the first address data from the external instrument, and
  executes a process associated with the first real address of the first storage media upon receiving the stipulated request format, the process being designated by the stipulated request format,
wherein the external instrument is enabled to send, in addition to the stipulated request format, a non-stipulated request format, which is directed to the second storage media, by using one of virtual addresses,
  the virtual addresses being assigned to a new address area that contains (i) the first address area of the first storage media and (ii) the second address area of the second storage media by defining a third address length that is equal to or longer than the first address length or the second address length, whichever is longer,
the control circuit being further configured to
  execute an address determination to determine a determined real address of the first storage media and the second storage media with reference to the new address area, the determined real address corresponding to an address that is designated within a received request format that is the stipulated request format or the non-stipulated request format, whichever is received from the external instrument, and
  execute a process associated with the determined real address of the first storage media and the second storage media as a result of executing the address determination, the process being designated by the received request format.

9. An electronic apparatus comprising:
a control circuit that
  receives a stipulated request format, which is stipulated in a predetermined telecommunications standard and sent by an external instrument, and
  executes a process designated by the stipulated request format upon receiving the stipulated request format;
a first storage media of which an address area has a real address that is defined as being designated by the stipulated request format; and
a second storage media of which an address area has a real address that is not defined as being designated by the stipulated request format,
wherein the external instrument sends (i) a first request format that is the stipulated request format designating a real address and (ii) a second request format that is the stipulated request format designating a virtual address, by enabling the first request format and the second request format to be differentiated from each other,
the control circuit being further configured to execute a process designated by a request format received from the external instrument
  on a premise that an address designated by the received request format is a real address when determining that the received request format corresponds to the first request format designating the real address, and/or
  on a premise that an address designated by the received request format is a virtual address when determining that the received request format corresponds to the second request format designating the virtual address.

10. The electronic apparatus according to claim 9,
the controller being further configured to differentiate between the first request format designating the real address and the second request format designating the virtual address by determining a difference between a data length of an address designated by the first request format and a data length of an address of the second request format.

11. The electronic apparatus according to claim 9,
wherein the external instrument is enabled to send the stipulated request format, which is directed to the first storage media, by using a virtual address that is different from the real address of the first storage media,
the control circuit being further configured to
  determine whether an address designated by the stipulated request format is a virtual address assigned to the first storage media, and
  execute a process, which is designated by the stipulated request format, to the virtual address assigned to the first storage media when determining that the address designated by the request format is the virtual address assigned to the first storage media.

* * * * *